March 2, 1948.　　　K. MILLER　　　2,436,817
CLUTCH ACTUATING MECHANISM
Original Filed Dec. 8, 1941
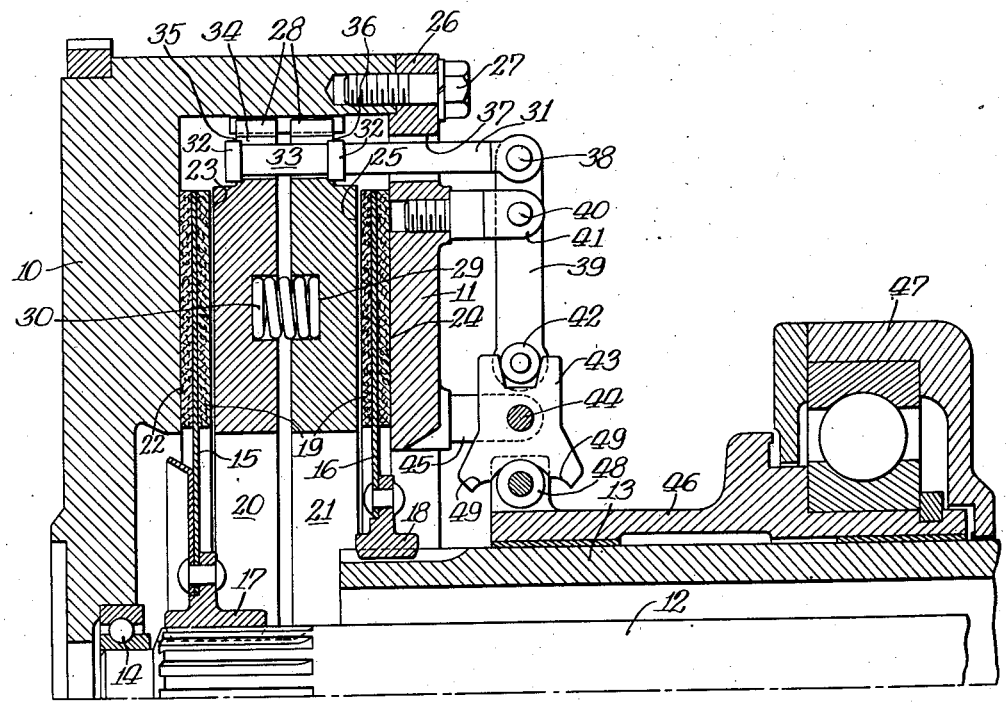
Inventor:-
Kay Miller.
Andrew F. Wintercorn
Atty.

Patented Mar. 2, 1948

2,436,817

UNITED STATES PATENT OFFICE 2,436,817

CLUTCH ACTUATING MECHANISM

Kay Miller, Kalamazoo, Mich., assignor, by mesne assignments, to Dana Corporation, Toledo, Ohio, a corporation of Virginia Original application December 8, 1941, Serial No. 422,045. Divided and this application July 22, 1944, Serial No. 546,171

19 Claims. (Cl. 192—68)

1

This application is a division of my copending application Serial No. 422,045 filed December 8, 1941, which has matured into Patent No. 2,379,023, June 26, 1945.

This invention relates to friction clutches and has particular reference to an improved clutch actuating mechanism, which although especially designed for use with two-way clutches having two disks adapted to have drive transmitted thereto selectively is also adapted for use with single disk clutches.

A salient feature of the present invention consists in the provision of spring means caged between the two sections of the pressure plate which are axially movable relative to one another, said spring means being maintained between said sections in preloaded condition, so as to cooperate with clutch actuating levers to apply increased spring pressure to the clutch disk when the clutch is engaged, and afford substantially constant pressure regardless of the usual wear on the clutch disk facings, and permit movement of the clutch actuating levers past dead-center, so that the clutch is automatically locked in engaged position against accidental disengagement until manually released.

The invention is illustrated in the accompanying drawing, which is a longitudinal section through a clutch embodying the clutch actuating mechanism of my invention, half of the section being omitted to permit showing the parts on a larger scale.

Referring to the drawing, the reference numeral 10 designates the flywheel of an engine, and 11 the back plate thereon. 12 is a driven shaft extending rearwardly from the flywheel adapted for direct connection with the propeller shaft or to be extended into the front end of the gear box of a transmission, and 13 is a quill surrounding the shaft and serving as an auxiliary driven member, the shaft 12 being for high ratio drive and the quill 13 for low ratio drive, as will soon appear. The shaft 12 has the usual pilot bearing 14 supporting the front end thereof at the center of the flywheel 10. 15 and 16 are clutch disks, the disk 15 having its center hub 17 splined on the front end of the shaft 12 to transmit drive from the flywheel to the shaft when the disk 15 is engaged, and the disk 16 having its hub 18 splined on the front end of the quill 13 to transmit drive from the flywheel to the quill when the disk 16 is engaged. At 19 are shown the usual pads or facings on the clutch disks, and at 20—21 is indicated a two-section pressure plate between the two disks, adapted when moved forwardly to engage disk 15 with the driving face 22 on the back of the flywheel and the companion driving face 23 on the front of the pressure plate section 20. The pressure plate is also movable rearwardly for engagement with disk 16 to cause engagement thereof with the driving face 24 on the back plate 11 and the companion driving face 25 on the back of the pressure plate section 21. The pressure plate sections are suitably cast like the flywheel and back plate and the faces 22—25 are accurately machined on these cast parts to insure smooth clutch engagement. The back plate is suitably bolted to the flywheel by means of its marginal flange portion 26, as indicated at 27. The pressure plate sections have sliding driving connections peripherally thereof with the rim portion of the flywheel, as indicated at 28, and have registering recesses 29 provided therein in circumferentially spaced relation for reception of coiled compression springs 30. Posts 31, of which there are preferably six for the clutch in circumferentially spaced relation, have annular shoulders projecting from the inner end portions 33 thereof in longitudinally spaced relation, and these end portions 33 are arranged to be entered in radial notches 34 provided therefor in the periphery of the pressure plate sections when the pressure plate sections are forced together. The shoulders 32 thereafter limit the extent to which the pressure plate sections will be free to move apart, thereby determining the preload compression of the springs 30, while at the same time allowing for further compression of the springs in the engagement of the clutch to secure engagement under increased spring pressure. The annular shoulders 35 and 36 provided on the peripheral portions of the pressure plate sections prevent disengagement of the posts 31 under centrifugal force with the pressure plate in neutral or in either engaged position. The posts 31 project freely through holes 37 provided in the back plate 11 and have pivotal connection, as at 38, with the outer ends of radially disposed elongated clutch actuating levers 39. The levers 39 are pivotally mounted intermediate their ends, as at 40, on forks 41 carried on the back plate. Rollers 42 are mounted on the inner ends of the levers 39 and are received in the outer forked ends of double fork pressure-multiplication lever members 43 pivotally mounted, as at 44, on lugs 45 suitably cast integral with and projecting rearwardly from the back plate. 46 is the throw-out collar reciprocable relative to the quill 13 as by means of the anti-friction shifter ring 47. The latter is usually provided with trunnions for cooperation with a yoke, or other clutch operating means, not shown. Rollers 48 carried on the forward end of the throw-out collar engage in the inner forked ends of the double forked members 43 a distance somewhat farther from the pivots 44 than the rollers 42, whereby to obtain a desired pressure-multiplication in the engagement of the clutch in either direction and have the advantage of a clutch operable with lighter hand or pedal pressure. Depressions 49 in the arms of the forked members 43 have the rollers 48 engage therein when the throw-out collar has been moved to either extreme position for engagement of the disk 15 or the disk 16. In that way the throw-out collar is held yieldingly in either of these extreme positions and there is avoided the likelihood of the clutch being accidentally disengaged. The forked members hold the pressure plate in neutral position when the throw-out collar 46 is in neutral position.

It should be understood that although I have shown a clutch having two disks 15 and 16 adapted to be driven selectively, the two-section pressure plate and the clutch actuating mechanism of my invention are also applicable to a clutch having only the one disk 15. Forward movement of the throw-out collar 46 by means of a manually operable clutch pedal or lever (not shown) causes engagement of the disk 15. On the other hand, when the collar 46 is moved rearwardly the disk 16 is engaged. The springs 30 in addition to providing resilient engagement in either a single disk or two-disk clutch so that close adjustment is not required, even though the clutch is of the over-center type, provide substantially constant pressure and accordingly non-slipping engagement regardless of the usual wear on the clutch facings 19. In addition, the springs act to hold the throw-out collar 46 resiliently in either engaged position, thus avoiding likelihood of accidental disengagement of the clutch. On the other hand, when the throw-out collar 46 is in the neutral position shown, the forked members 43 hold the pressure plate in the mid-position, out of engagement with both disks, and there is no likelihood of accidental engagement of the clutch.

It is believed the foregoing description conveys a good understanding of the objects and advantages of my invention. The appended claims have been drawn to cover all legitimate modifications and adaptations.

I claim:

1. In a friction clutch, the combination of a flywheel constituting the driving element, a clutch disk constituting the driven element, a pressure plate for engaging the clutch disk with the flywheel and comprising relatively axially movable parts, spring means caged between said pressure plate parts in preloaded condition, one or more pressure plate actuating members having a lost motion operating connection with said axially movable parts so as to permit movement relative to one of said parts upon movement with the other of said parts in engagement and disengagement of the clutch, said spring means normally maintaining the lost motion connection in fully extended condition, said members extending from the pressure plate to engage the clutch and further compress the aforesaid spring means so that the clutch is engaged resiliently under increased spring pressure, and clutch engaging means cooperating with said actuating members to move the pressure plate.

2. In a friction clutch, the combination of a flywheel constituting the driving element, a back plate therefor, a clutch disk constituting the driven element, a pressure plate for engaging the clutch disk with the flywheel and comprising relatively axially movable parts, spring means caged between said pressure plate parts in preloaded condition, one or more pressure plate actuating members extending from the pressure plate to engage the clutch and further compress the aforesaid spring means so that the clutch is engaged resiliently under increased spring pressure, levers pivoted on the back plate intermediate their ends and connected at one end with said actuating members, a throw-out collar, and intermediate members pivoted on the back plate and operatively connected at one end to the other end of said levers and operatively connected at the other end to the throw-out collar.

3. A clutch as set forth in claim 2, wherein the last mentioned connection includes a roller mounted on the throw-out collar and rollingly engaged in a fork on the intermediate member, one of the arms of the fork having a recess provided therein to establish a position of the throw-out collar corresponding to the engaged position of the clutch in which the spring means is compressed above the preload pressure to a predetermined pressure.

4. A clutch as set forth in claim 2, including means for holding the throw-out collar releasably in a position of the collar corresponding to the engaged position of the clutch in which the spring means is compressed above the preload pressure to a predetermined pressure.

5. In a friction clutch, the combination of a flywheel constituting the driving element, a back plate therefor, a clutch disk constituting the driven element, a pressure plate for engaging the clutch disk with the flywheel, one or more pressure plate actuating members extending from the pressure plate to engage the clutch, levers pivoted on the back plate intermediate their ends but closer to their outer ends and connected at their outer ends with said actuating members, a throw-out collar, and intermediate pressure-multiplication lever members pivoted nearer one end on the back plate and operatively connected at the short end to the inner end of said levers and operatively connected at the long end to the throw-out collar so that a given forward movement of the throw-out collar results in a shorter forward movement of the pressure plate.

6. In a friction clutch, the combination of a flywheel constituting the driving element, a clutch disk constituting the driven element, a pressure plate for engaging the clutch disk with the flywheel and comprising relatively axially movable parts, spring means caged between said pressure plate parts in preloaded condition, one or more pressure plate actuating members extending from the pressure plate to engage the clutch and further compress the aforesaid spring means so that the clutch is engaged resiliently under increased spring pressure, levers pivoted on the back plate intermediate their ends but closer to their outer ends and connected at their outer ends with said actuating members, a throw-out collar, and intermediate pressure-multiplication lever members pivoted nearer one end on the back plate and operatively connected at the short end to the inner end of said levers and operatively connected at the long end to the throw-out collar so that a given forward movement of the throw-out collar results in a shorter forward movement of the pressure plate.

7. In a friction clutch, the combination of a flywheel having a back plate, a clutch disk, a pressure plate for engaging the clutch disk with the flywheel and comprising relatively axially movable parts, preloaded spring means normally urging said pressure plate parts apart, whereby the clutch is adapted to be engaged resiliently with increased pressure upon engagement of said pressure plate with the clutch disk, one or more pressure plate actuating members extending rearwardly from the pressure plate having a lost motion connection with the forward axially movable part thereof, which connection predetermines the extent to which said parts may be separated and, hence, predetermines the preload pressure, a throw-out member movable toward and away from the back plate, and positive acting over-center lever means operatively connected with the pressure plate actuating members and operable by said throw-out member to engage the clutch and lock the same in engaged position.

8. In a friction clutch, the combination of a flywheel having a back plate, a clutch disk, a pressure plate for engaging said disk with the flywheel, one or more pressure plate actuating members extending behind the back plate, levers pivoted on the back plate intermediate their ends but closer to their outer ends and connected at their outer ends with said actuating members, spring means subjected to deflection by clutch engaging movement of said pressure plate actuating members and active in deflected condition against the pressure plate in the direction of clutch engagement whereby the clutch is engaged resiliently under increased spring pressure, a throw-out member movable toward and away from the back plate, and over-center means operatively connected with the inner ends of the aforesaid levers and operable by said throw-out member to move the pressure plate to engaged position and lock the clutch in engaged condition.

9. In a friction clutch, the combination of a flywheel having a back plate, a clutch disk, a pressure plate for engaging said disk with the flywheel, pressure plate actuating members extending behind the back plate, levers pivoted on the back plate intermediate their ends but closer to their outer ends and connected at their outer ends with said actuating members, preloaded spring means subjected to deflection by clutch engaging movement of said pressure plate actuating members and active in deflected condition against the pressure plate in the direction of clutch engagement whereby the clutch is engaged resiliently under increased spring pressure, a throw-out member movable toward and away from the back plate, and over-center means operatively connected with the inner ends of the aforesaid levers and operable by said throw-out member to move the pressure plate to engaged position and lock the clutch in engaged condition.

10. In a friction clutch, the combination of a flywheel having a back plate, a clutch disk, a pressure plate for engaging said disk with the flywheel, pressure plate actuating members extending behind the back plate, levers pivoted on the back plate intermediate their ends but closer to their outer ends and connected at their outer ends with said actuating members, spring means subjected to deflection in the engagement of the pressure plate with said disk whereby the clutch is engaged resiliently, a throw-out member, and intermediate pressure-multiplication lever members pivoted nearer one end on the back plate and operatively connected at the short end to the inner end of said levers and operatively connected at the long end to the throw-out member so that a given forward movement of the throw-out member results in a shorter forward movement of the pressure plate, and vice versa.

11. In a friction clutch, the combination of a flywheel having a back plate, a clutch disk, a pressure plate for engaging said disk with the flywheel, pressure plate actuating members extending behind the back plate, levers pivoted on the back plate intermediate their ends but closer to their outer ends and connected at their outer ends with said actuating members, preloaded spring means subjected to deflection in the engagement of the pressure plate with said disk whereby the clutch is engaged resiliently under increased spring pressure, a throw-out member, and intermediate pressure-multiplication lever members pivoted nearer one end on the back plate and operatively connected at the short end to the inner end of said levers and operatively connected at the long end to the throw-out member so that a given forward movement of the throw-out member results in a shorter forward movement of the pressure plate, and vice versa.

12. In a friction clutch, the combination of a flywheel constituting the driving element, a back plate therefor, a clutch disk constituting the driven element, a pressure plate for engaging the clutch disk with the flywheel and comprising relatively axially movable parts, spring means caged between said pressure plate parts in preloaded condition, one or more pressure plate actuating members extending from the pressure plate to engage the clutch and further compress the aforesaid spring means so that the clutch is engaged resiliently under increased spring pressure, levers pivoted on the back plate intermediate their ends but closer to their outer ends and connected at their outer ends with said actuating members, a throw-out collar, and intermediate members pivoted on the back plate and operatively connected at one end to the inner end of said levers and operatively connected at the other end to the throw-out collar, whereby a given forward movement of the throw-out collar results in a shorter forward movement of the pressure plate.

13. A clutch as set forth in claim 12, wherein the last mentioned connection includes a roller mounted on the throw-out collar and rollingly engaged in a fork on the intermediate member, one of the arms of the fork having a recess provided therein to establish a position of the throw-out collar corresponding to the engaged position of the clutch in which the spring means is compressed above the preload pressure to a predetermined pressure.

14. A clutch as set forth in claim 12, including means for holding the throw-out collar releasably in a position of the collar corresponding to the engaged position of the clutch in which the spring means is compressed above the preload pressure to a predetermined pressure.

15. In a friction clutch, the combination of a flywheel constituting the driving element, a back plate therefor, a clutch disk constituting the driven element, a pressure plate for engaging the clutch disk with the flywheel and comprising relatively axially movable parts, spring means caged between said pressure plate parts in preloaded condition, one or more pressure plate actuating members extending from the pressure plate to engage the clutch and further compress the aforesaid spring means so that the clutch is engaged resiliently under increased spring pressure, levers pivoted on the back plate intermediate their ends and connected at their outer end with said actuating members, a throw-out collar, and intermediate pressure multiplication lever members pivoted nearer one end on the back plate and operatively connected at the short end to the inner end of said levers and operatively connected at the long end to the throw-out collar so that a given forward movement of the throw-out collar results in a shorter forward movement of the pressure plate.

16. A clutch as set forth in claim 15, wherein the last mentioned connection includes a roller mounted on the throw-out collar and rollingly engaged in a fork on the intermediate member, one of the arms of the fork having a recess provided therein to establish a position of the throw-out collar corresponding to the engaged position of the clutch in which the spring means is compressed above the preload pressure to a predetermined pressure.

17. A clutch as set forth in claim 15, including means for holding the throw-out collar releasably in a position of the collar corresponding to the engaged position of the clutch in which the spring means is compressed above the preload pressure to a predetermined pressure.

18. In a friction clutch, the combination of a flywheel having a back plate, a clutch disk, a pressure plate for engaging said disk with the flywheel, pressure plate actuating members extending behind the back plate, levers pivoted on the back plate intermediate their ends and connected at their outer ends with said actuating members, spring means subjected to deflection in the engagement of the pressure plate with said disk whereby the clutch is engaged resiliently, a throw-out member, and intermediate pressure-multiplication lever members pivoted nearer one end on the back plate and operatively connected at the short end to the inner end of said levers and operatively connected at the long end to the throw-out member so that a given forward movement of the throw-out member results in a shorter forward movement of the pressure plate, and vice versa.

19. In a friction clutch, the combination of a flywheel having a back plate, a clutch disk, a pressure plate for engaging said disk with the flywheel, pressure plate actuating members extending behind the back plate, levers pivoted on the back plate intermediate their ends but closer to their outer ends and connected at their outer ends with said actuating members, spring means subjected to deflection in the engagement of the pressure plate with said disk whereby the clutch is engaged resiliently, a throw-out member, and intermediate lever members pivoted intermediate their ends on the back plate and operatively connected at their outer end to the inner end of said levers and operatively connected at their inner end to the throw-out member, whereby a given forward movement of the throw-out member results in a shorter forward movement of the pressure plate, and vice versa.

KAY MILLER.

REFERENCES CITED

The following references are of record in the file of this patent:

UNITED STATES PATENTS

| Number | Name | Date |
| --- | --- | --- |
| 2,350,411 | Nabstedt | June 6, 1944 |
| 2,168,960 | Morris | Aug. 8, 1939 |
| 2,125,433 | Dunkelow | Aug. 2, 1938 |
| 2,090,397 | Haupt | Aug. 17, 1937 |

FOREIGN PATENTS

| Number | Country | Date |
| --- | --- | --- |
| 413,006 | France | May 14, 1910 |